(12) United States Patent
Ellwood, III (10) Patent No.: US 11,078,807 B2
(45) Date of Patent: Aug. 3, 2021

(54) TURBOCHARGER AND MATING RING INCLUDED THEREIN

(71) Applicant: BorgWarner Inc., Auburn Hills, MI (US)

(72) Inventor: Erwin Perry Ellwood, III, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 151 days.

(21) Appl. No.: 16/135,491

(22) Filed: Sep. 19, 2018

(65) Prior Publication Data

US 2020/0088066 A1    Mar. 19, 2020

(51) Int. Cl.
*F01D 25/24* (2006.01)
*F01D 11/00* (2006.01)
(Continued)

(52) U.S. Cl.
CPC .......... *F01D 25/246* (2013.01); *F01D 11/003* (2013.01); *F02C 6/12* (2013.01);
(Continued)

(58) Field of Classification Search
CPC .... F01D 25/246; F01D 11/003; F01D 25/183; F02C 6/12; F02C 7/28; F05D 2220/40;
(Continued)

(56) References Cited

U.S. PATENT DOCUMENTS 4,420,160 A * 12/1983 Laham ..................... F16J 15/38
277/306
4,523,764 A 6/1985 Albers et al.
(Continued)

FOREIGN PATENT DOCUMENTS

CN 109654040 A 4/2019
DE 102006015571 A1 10/2007
(Continued)

OTHER PUBLICATIONS

English language abstract and machine-assisted English translation for CN 109654040 extracted from espacenet.com database on Mar. 12, 2020, 6 pages.
(Continued)

*Primary Examiner* — J. Todd Newton
*Assistant Examiner* — Eric J Zamora Alvarez
(74) *Attorney, Agent, or Firm* — Howard & Howard Attorneys PLLC (57) ABSTRACT

A turbocharger includes a shaft, a compressor wheel, and a seal assembly. The seal assembly includes a carbon ring having a carbon surface having a carbon ring inner diameter and a carbon ring outer diameter. The seal assembly also includes a mating ring having a mating surface facing the carbon surface of the carbon ring. The mating surface has a land portion configured to contact the carbon surface between a first mating diameter radially aligned with the carbon ring inner diameter and a second mating diameter radially aligned with the carbon ring outer diameter. The land portion has a land area between the first and second mating diameters. The mating surface defines a plurality of grooved portions. The plurality of grooved portions have a grooved area between the first and second mating diameters. A ratio of the land area to the grooved area is between 1.3 and 2.9.

19 Claims, 9 Drawing Sheets

(51) Int. Cl.
*F02C 6/12* (2006.01)
*F01D 11/02* (2006.01)
*F02B 37/04* (2006.01)
*F02B 39/16* (2006.01)
*F04D 29/12* (2006.01)

(52) U.S. Cl.
CPC .... *F05D 2220/40* (2013.01); *F05D 2230/642* (2013.01); *F05D 2240/55* (2013.01)

(58) Field of Classification Search
CPC ............ F05D 2230/642; F05D 2240/55; F16J 15/3412; F04D 25/04; F04D 29/063; F04D 29/12
See application file for complete search history.

(56) References Cited

U.S. PATENT DOCUMENTS

| | | | |
|---|---|---|---|
| 5,071,141 A * | 12/1991 | Lai | F16J 15/3412 277/361 |
| 5,441,283 A * | 8/1995 | Pecht | F16J 15/3412 277/400 |
| 5,722,665 A * | 3/1998 | Sedy | F16J 15/3412 277/400 |
| 6,142,478 A | 11/2000 | Pecht et al. | |
| 6,325,380 B1 * | 12/2001 | Feigl | F01D 25/168 277/352 |
| 7,265,080 B2 | 9/2007 | Iso et al. | |
| 7,997,802 B2 * | 8/2011 | Simon | F16C 17/22 384/130 |
| 8,162,322 B2 | 4/2012 | Flaherty | |
| 8,540,249 B2 | 9/2013 | Prellwitz | |
| 8,641,366 B1 | 2/2014 | Ullah et al. | |
| 9,574,459 B2 | 2/2017 | Ullah et al. | |
| 9,574,666 B2 | 2/2017 | Ferris et al. | |
| 9,909,438 B2 | 3/2018 | Duffy et al. | |
| 9,951,784 B2 | 4/2018 | Agrawal et al. | |
| 2002/0070505 A1 | 6/2002 | Auber | |
| 2003/0037546 A1 | 2/2003 | Kapich | |
| 2014/0086741 A1 | 3/2014 | Ullah | |
| 2014/0117625 A1 | 5/2014 | Short et al. | |
| 2014/0370412 A1 | 12/2014 | Sumser et al. | |
| 2015/0125263 A1 | 5/2015 | Grabowska | |
| 2017/0096905 A1 | 4/2017 | Lebigre | |
| 2018/0163617 A1 | 6/2018 | Merritt et al. | |
| 2018/0163739 A1 | 6/2018 | Tabacchi et al. | |
| 2019/0085768 A1 | 3/2019 | Ikeya | |

FOREIGN PATENT DOCUMENTS

| | | |
|---|---|---|
| DE | 102009004035 A1 | 7/2010 |
| DE | 102016015266 A1 | 6/2018 |
| JP | 2002369474 A | 12/2002 |
| JP | 2004245381 A | 9/2004 |
| JP | 2004301225 A | 10/2004 |
| JP | 2014114879 A | 6/2014 |
| JP | 2017002750 A | 1/2017 |
| WO | 2013006560 A1 | 1/2013 |
| WO | 2013106303 A1 | 7/2013 |
| WO | 2014046931 A1 | 3/2014 |
| WO | 2014209852 A1 | 12/2014 |
| WO | 2017146977 A1 | 8/2017 |

OTHER PUBLICATIONS

English language abstract and machine-assisted English translation for DE 10 2006 015 571 extracted from espacenet.com database on Mar. 12, 2020, 6 pages.

Machine-assisted English language abstract and machine-assisted English translation for DE 10 2016 015 266 extracted from espacenet. com database on Mar. 12, 2020, 11 pages.

English language abstract and machine-assisted English translation for JP 2002-369474 extracted from espacenet.com database on Mar. 12, 2020, 13 pages.

English language abstract and machine-assisted English translation for JP 2004-245381 extracted from espacenet.com database on Mar. 12, 2020, 9 pages.

English language abstract and machine-assisted English translation for JP 2004-301225 extracted from espacenet.com database on Mar. 12, 2020, 6 pages.

English language abstract and machine-assisted English translation for JP 2014-114879 extracted from espacenet.com database on Mar. 12, 2020, 9 pages.

English language abstract and machine-assisted English translation for JP 2017-002750 extracted from espacenet.com database on Mar. 12, 2020, 22 pages.

Garrett Motion, "Two Stage Electric Compressor for Fuel Cells Website", https://www.garrettmotion.com/electric-hybrid/twostage-electric-compressor-for-fuel-cells/, 2019, 7 pages.

English language abstract for DE 10 2009 004 035 extracted from espacenet.com database on Oct. 10, 2018, 2 pages.

* cited by examiner

TURBOCHARGER AND MATING RING INCLUDED THEREIN

BACKGROUND OF THE INVENTION

1. Field of the Invention

The present invention relates generally to a turbocharger and, more specifically, to a mating ring for use in the turbocharger.

2. Description of the Related Art

Rotating machines, such as turbochargers, are used in various applications, such as vehicles, heavy equipment, diesel engines, motors, and the like. Typical turbochargers include a bearing housing, a shaft extending along an axis between a first end and a second end spaced from the first end along the axis, one or more bearings disposed in the bearing housing to rotatably support the shaft, and a compressor wheel coupled to the first end of the shaft. Typical turbochargers include a seal assembly disposed toward the compressor wheel to inhibit the flow of lubricant from the one or more bearings in the bearing housing. The seal assembly typically includes either a piston ring seal, or a carbon ring disposed about the shaft and spaced from the compressor wheel along the axis. In typical turbochargers that use a carbon ring, the carbon ring has a carbon surface having a carbon ring inner diameter and a carbon ring outer diameter spaced from the carbon ring inner diameter radially away from the axis. Such sealing assemblies of typical turbochargers that include a carbon ring also include a mating ring disposed about the shaft and spaced from the compressor wheel along the axis such that the carbon ring is disposed between the compressor wheel and the mating ring. The mating ring has a mating surface facing the carbon surface of the carbon ring.

The mating surface has a land portion that contacts the carbon surface between a first mating diameter radially aligned with the carbon ring inner diameter with respect to the axis and a second mating diameter radially aligned with the carbon surface outer diameter with respect to the axis. The land portion has a land area between the first and second mating diameters. The mating surface defines a plurality of grooved portions disposed about the axis, and with the plurality of grooved portions having a grooved area between the first and second mating diameters.

In turbochargers, there are benefits to having the carbon seal "lift off," i.e., become disengaged, from the mating surface at an optimum rotational speed. Such benefits include reducing mechanical losses of the turbocharger and improving durability of the mating ring and carbon ring. However, in typical turbochargers, there is often a problem with the carbon ring not "lifting off" at optimum rotational speeds. For example, if a geometry of the grooved portions and/or a ratio of the land area to the grooved area is not optimized, the carbon ring will "lift off" at too low of a rotational speed or too high of a rotational speed from the mating ring surface during operation of the turbocharger. If the carbon ring "lift off" occurs at too low of a rotational speed, the carbon ring may not have sufficient sealing performance. If the carbon seal "lift off" occurs at too high of a rotational speed, frictional effects may be excessive from the carbon ring and the mating ring remaining engaged, which results in decreased turbocharger performance and potential damage of the carbon ring.

As such, there remains a need to provide an improved mating ring.

SUMMARY OF THE INVENTION AND ADVANTAGES

A turbocharger for delivering compressed air to an internal combustion engine and for receiving exhaust gas from the internal combustion engine includes a shaft extending along an axis between a first end and a second end spaced from the first end along the axis, a compressor wheel coupled to the first end of the shaft, and a seal assembly. The seal assembly includes a carbon ring disposed about the shaft and spaced from the compressor wheel along the axis, with the carbon ring having a carbon surface having a carbon ring inner diameter and a carbon ring outer diameter spaced from the carbon ring inner diameter radially away from the axis. The seal assembly also includes a mating ring disposed about the shaft and spaced from the compressor wheel along the axis such that the carbon ring is disposed between the compressor wheel and the mating ring, with the mating ring having a mating surface facing the carbon surface of the carbon ring. The mating surface has a land portion configured to contact the carbon surface between a first mating diameter radially aligned with the carbon ring inner diameter with respect to the axis and a second mating diameter radially aligned with the carbon ring outer diameter with respect to the axis, and with the land portion having a land area between the first and second mating diameters. The mating surface defines a plurality of grooved portions disposed about the axis. The plurality of grooved portions have a grooved area between the first and second mating diameters. A ratio of said land area to said grooved area is between 1.3 and 2.9. A mating ring for use in a rotating machine is also disclosed herein.

Accordingly, the mating ring having a ratio of the land area to the grooved area between 1.3 and 2.9 ensures that the carbon ring lifts off from the mating ring at the optimal rotational speed, which ultimately reduces mechanical losses of the turbocharger, improves durability of the turbocharger, improves performance of the turbocharger, and reduces damage to the carbon ring and the mating ring.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
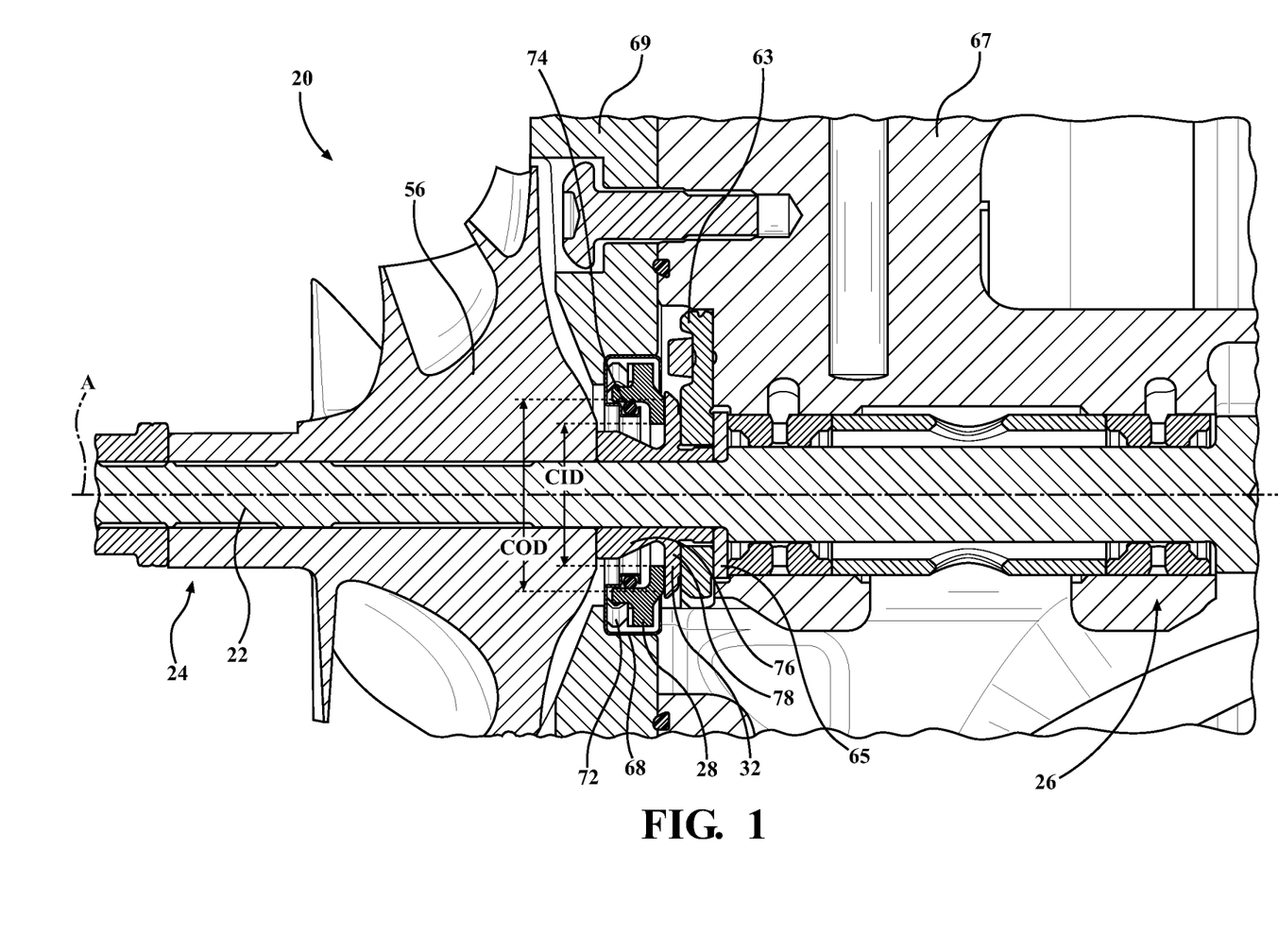
FIG. 1 is a cross-sectional view of a rotating machine, with the rotating machine including a shaft extending along an axis, a carbon ring disposed about the shaft, and a mating ring disposed about the shaft.

With reference to the Figures, wherein like numerals indicate like parts throughout the several views, a rotating machine 20 is shown in cross-sectional view in FIG. 1. The rotating machine 20 may be used in vehicles, heavy equipment, diesel engines, motors, turbo-compound engines, and the like, and particularly in high rotational speed applications, such as 200,000 to 300,000 RPM. The rotating machine 20 may be a turbocharger, as described in further detail below. The rotating machine 20 may be an electric compressor, such as an eBooster®.

The rotating machine 20 includes a shaft 22 extending along an axis A between a first end 24 and a second end 26 spaced from the first end 24 along the axis A. The rotating machine 20 also includes a carbon ring 28 having a carbon surface 30, as shown in FIG. 3, having a carbon ring inner diameter CID and a carbon ring outer diameter COD spaced from the carbon ring inner diameter CID, as shown in FIGS. 1 and 5.

Figure 3:
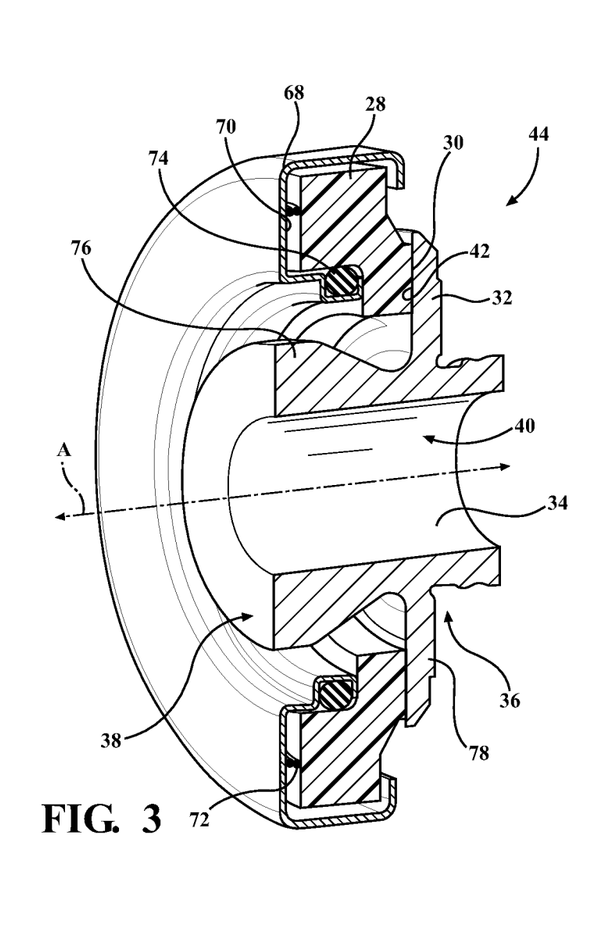
FIG. 3 is a perspective cross-sectional view of a seal assembly including the carbon ring and the mating ring.
Figure 4:
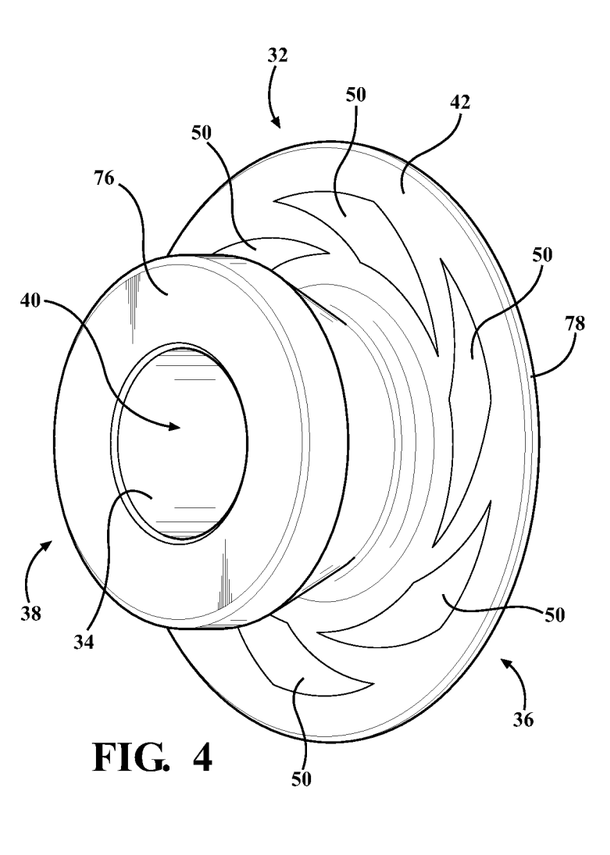
FIG. 4 is a perspective view of the mating ring defining a plurality of grooved portions.

With reference to FIG. 3, the rotating machine 20 includes a mating ring 32 having an interior surface 34 extending along the axis A between a first mating end 36 and a second mating end 38 spaced from the first mating end 36. The interior surface 34 of the mating ring 32 defines a bore 40 adapted to be disposed about the shaft 22. The mating ring 32 has a mating surface 42. The mating ring 32 and the carbon ring 28 collectively form a seal assembly 44, as shown in FIG. 3. The seal assembly 44, as described in further detail below, forms a seal between the mating surface 42 and the carbon surface 30. The seal assembly 44 is commonly referred to as a dry-gas seal, a face seal, a lift-off face seal, a non-contacting face seal, a mechanical face seal, a shallow hydropad seal, a groove seal, or a spiral groove seal.

Figure 5:
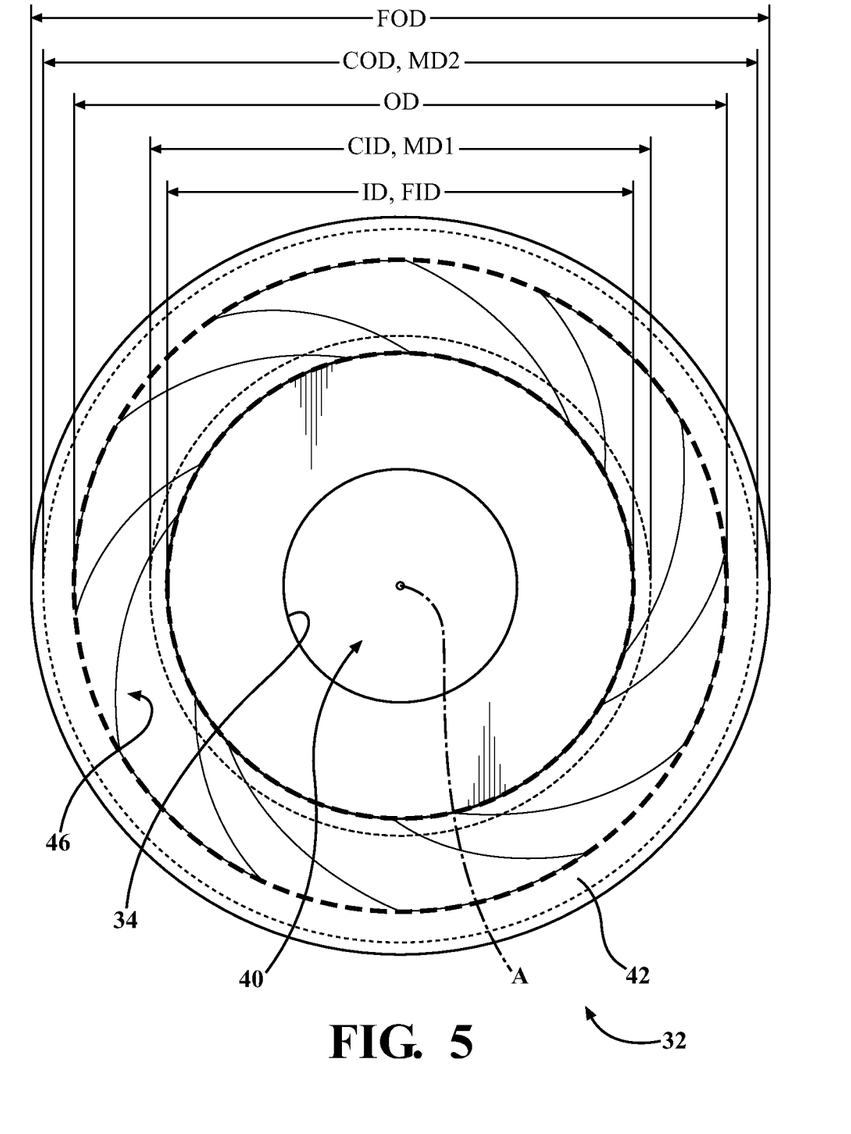
FIG. 5 is a top view of a mating surface of the mating ring, with the mating surface having a land portion and a first mating diameter adapted to be radially aligned with a carbon ring inner diameter with respect to the axis and a second mating diameter adapted to be radially aligned with a carbon surface outer diameter with respect to the axis.

As shown in FIG. 5, the mating surface 42 has a land portion 46 adapted to contact the carbon surface 30 between a first mating diameter MD1 adapted to be radially aligned with the carbon ring inner diameter CID with respect to the axis A, and a second mating diameter MD2 adapted to be radially aligned with the carbon ring outer diameter COD with respect to the axis A. The carbon ring 28 is removed in FIG. 5 such that the mating ring 32 and mating surface 42 is shown clearly. Additionally, as shown in FIG. 5, the carbon ring inner diameter CID and carbon ring outer diameter COD are shown with respect to the mating surface 42 to illustrate where the carbon surface 30 contacts the mating surface 42.

Figure 6:
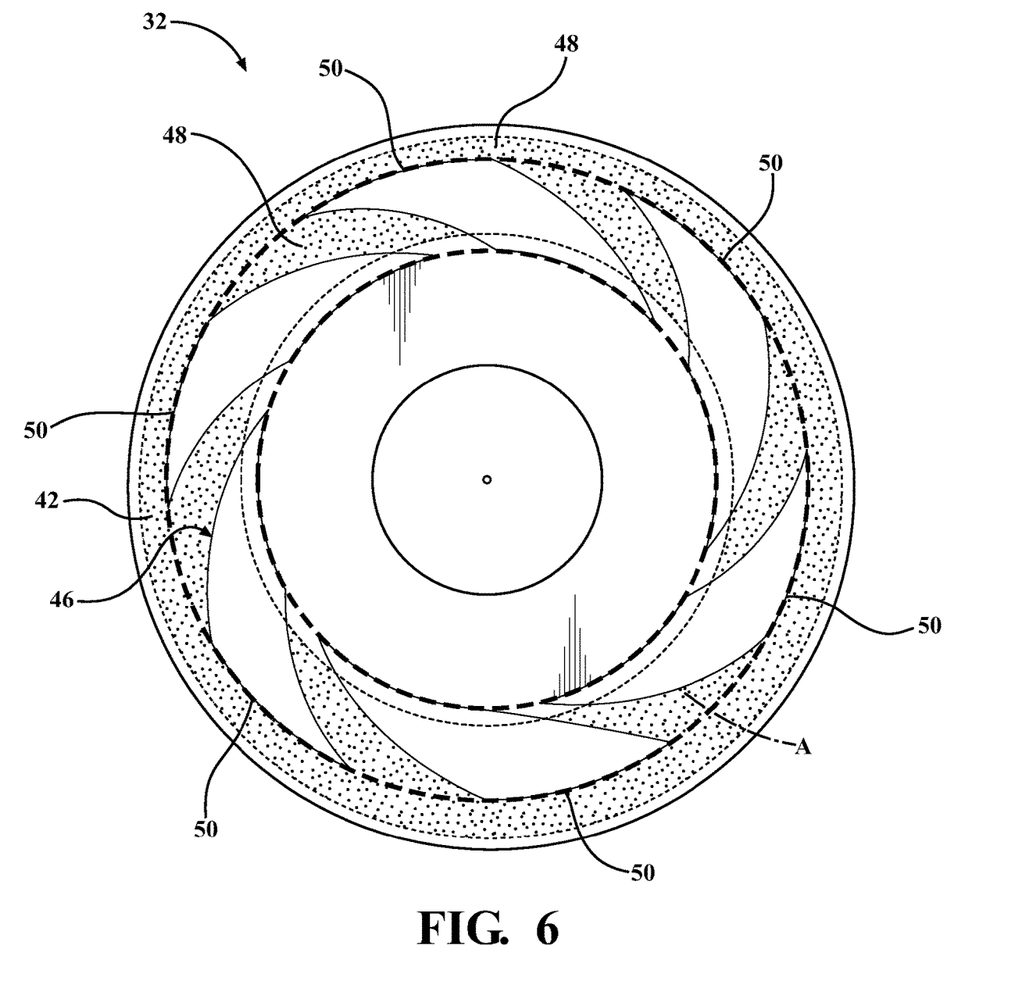
FIG. 6 is a top view of the mating surface of the mating ring, with the land portion having a land area between the first and second mating diameters, and with the land area shaded.
Figure 8:
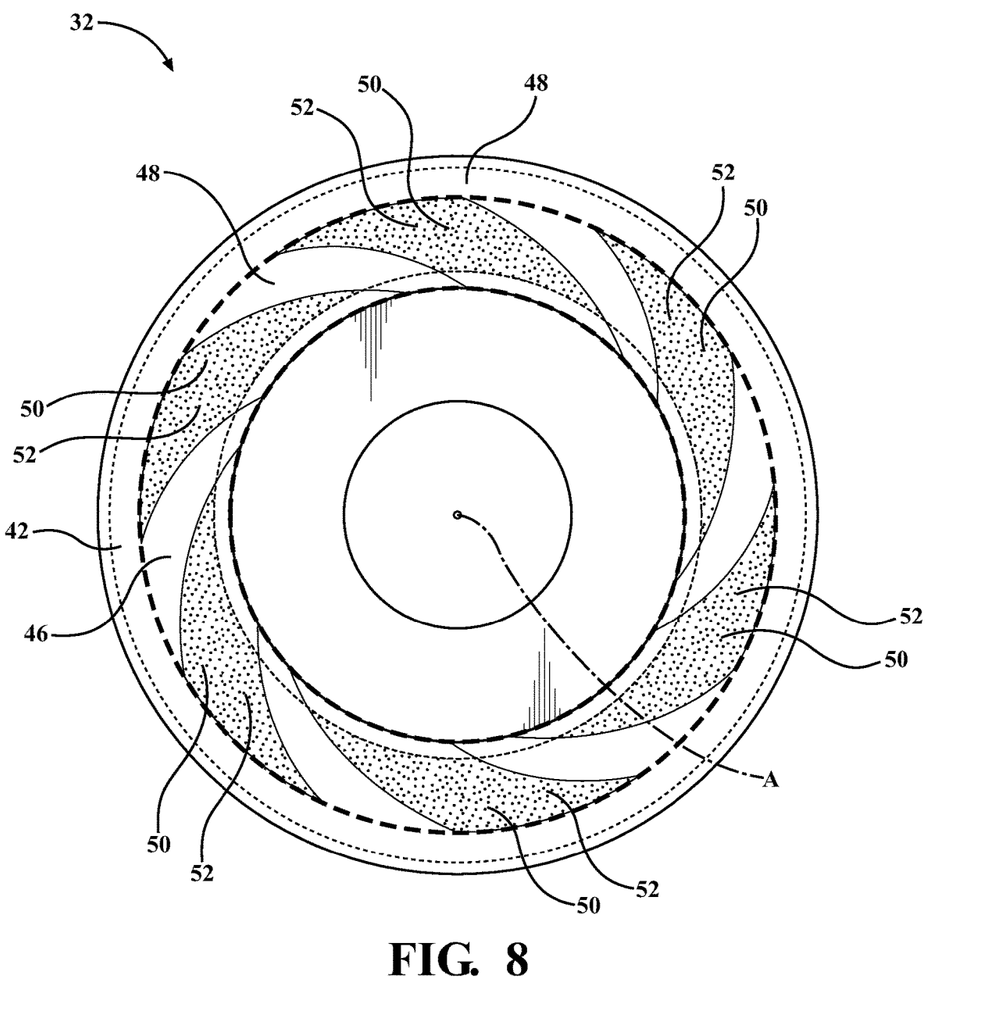
FIG. 8 is a top view of the mating surface of the mating ring, with the plurality of grooved portions having a grooved area between the first and second mating diameters, and with the grooved area shaded.

The land portion 46 has a land area 48, which is shown in FIG. 6 as the shaded area on the mating surface 42, between the first and second mating diameters MD1, MD2. The mating surface 42 defines a plurality of grooved portions 50 disposed about the axis A. The plurality of grooved portions 50 have a grooved area 52, which is shown in FIG. 8 as the shaded area defined by the mating surface 42, between the first and second mating diameters MD1, MD2.

A ratio of the land area 48 to the grooved area 52 is between 1.3 and 2.9. Having the ratio of the land area 48 to the grooved area 52 between 1.3 and 2.9 ensures that the carbon ring 28 lifts off, i.e., becomes disengaged, from the mating ring 32 at the optimal rotational speed from a fluid pressure, which may be caused by oil or air, exiting the plurality of grooved portions 50 caused by rotation of the mating ring 32. For example, having the carbon ring 28 lift off from the mating ring 32 reduces mechanical losses of the rotating machine 20 and improves durability of the rotating machine 20. Specifically, the ratio of the land area 48 to the grooved area 52 between 1.3 and 2.9 improves durability of the carbon ring, and reduces mechanical losses caused by the carbon ring 28 and mating ring 32 remaining in contact for too long. The ratio of the land area 48 to the grooved area 52 between 1.3 and 2.9 is optimal for ensuring lift off of the carbon ring 28 from the mating ring 32 does not occur at too low or too high of a rotational speed of the mating ring 32.

If the ratio of the land area 48 to the grooved area 52 is greater than 2.9, the carbon ring 28 is not able to lift off from the mating ring 32 at low rotational speeds of the mating ring 32, such as 10,000 to 20,000 RPM, because the force ("lift off" force) on the carbon ring 28 caused by fluid pressure inside the plurality of grooved portions 50 is too low. This ultimately decreases performance of the rotating machine 20, because the mating ring 32 and carbon ring 28 remain engaged for too long. Additionally, the carbon ring 28 may not have sufficient sealing performance if the carbon ring 28 and mating ring 32 remain engaged for too long.

Figure 10:
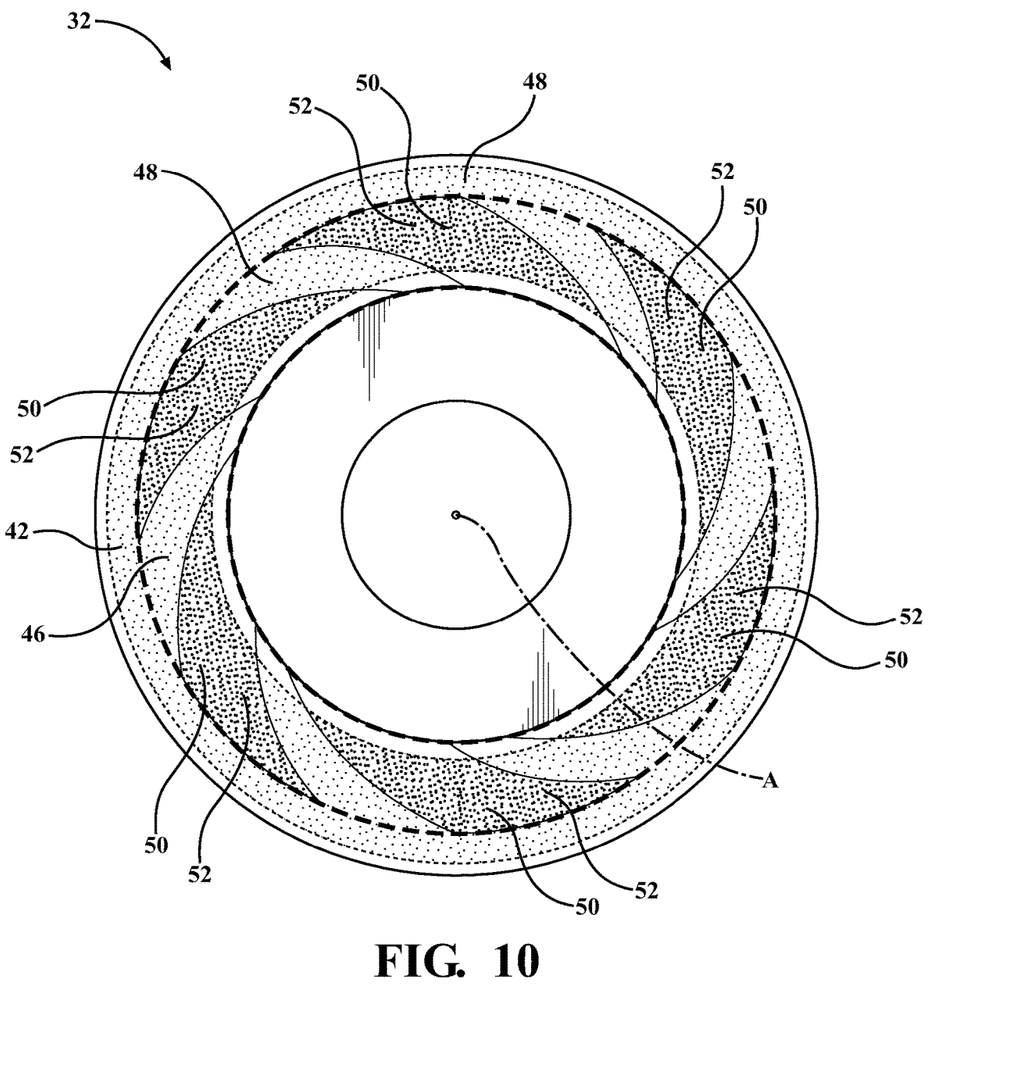
FIG. 10 is a top view of the mating surface of the mating ring, with the land area shown as lightly shaded and the grooved area shown as dark shaded, and with a ratio of the land area to the grooved area being between 1.3 and 2.9.

If the ratio of the land area 48 to the grooved area 52 is less than 1.3, the land area 48 becomes too small, which results in the plurality of grooved portions 50 damaging the carbon ring 28 because the carbon surface 30 does not have an adequate amount of land area 48 to engage. Damage to the carbon ring 28 can increase oil leakage in the rotating machine 20. Additionally, frictional effects may be excessive if the carbon ring 28 and the mating ring 32 remain engaged during high rotational speeds of the mating ring 32, which results in decreased turbocharger performance and potential damage of the carbon ring 28. To this end, having the ratio of the land area 48 to the grooved area 52 between 1.3 and 2.9 optimizes durability of the carbon ring 28 and overall performance of the rotating machine 20. The ratio of the land area 48 to the grooved area 52 is shown in FIG. 10, where the light shaded area is the land area 48 and the dark shaded area is the grooved area 52. Specifically, the grooved area 52 includes all of the dark shaded area in FIG. 10, and the land area 48 includes all of the light shaded area in FIG. 10. As described above, the ratio of the light shaded area, i.e., the land area 48, to the dark shaded area, i.e., the grooved area 52, is between 1.3 and 2.9. In one embodiment, the ratio of the land area 48 to the grooved area 52 may be between 1.75 and 2.75. In another embodiment, the ratio of the land area 48 to the grooved area 52 may be 1.4. In another embodiment, the ratio of the land area 48 to the grooved area 52 may be 1.5. In another embodiment, the ratio of the land area 48 to the grooved area 52 may be 1.6. In another embodiment, the ratio of the land area 48 to the grooved area 52 may be 1.7. In another embodiment, the ratio of the land area 48 to the grooved area 52 may be 1.8. In another embodiment, the ratio of the land area 48 to the grooved area 52 may be 1.9. In another embodiment, the ratio of the land area 48 to the grooved area 52 may be 2.0. In another embodiment, the ratio of the land area 48 to the grooved area 52 may be 2.1. In another embodiment, the ratio of the land area 48 to the grooved area 52 may be 2.2. In another embodiment, the ratio of the land area 48 to the grooved area 52 may be 2.3. In another embodiment, the ratio of the land area 48 to the grooved area 52 may be 2.4. In another embodiment, the ratio of the land area 48 to the grooved area 52 may be 2.5. In another embodiment, the ratio of the land area 48 to the grooved area 52 may be 2.6. In another embodiment, the ratio of the land area 48 to the grooved area 52 may be 2.7. In another embodiment, the ratio of the land area 48 to the grooved area 52 may be 2.8. In another embodiment, the ratio of the land area 48 to the grooved area 52 may be 2.9.

Figure 2:
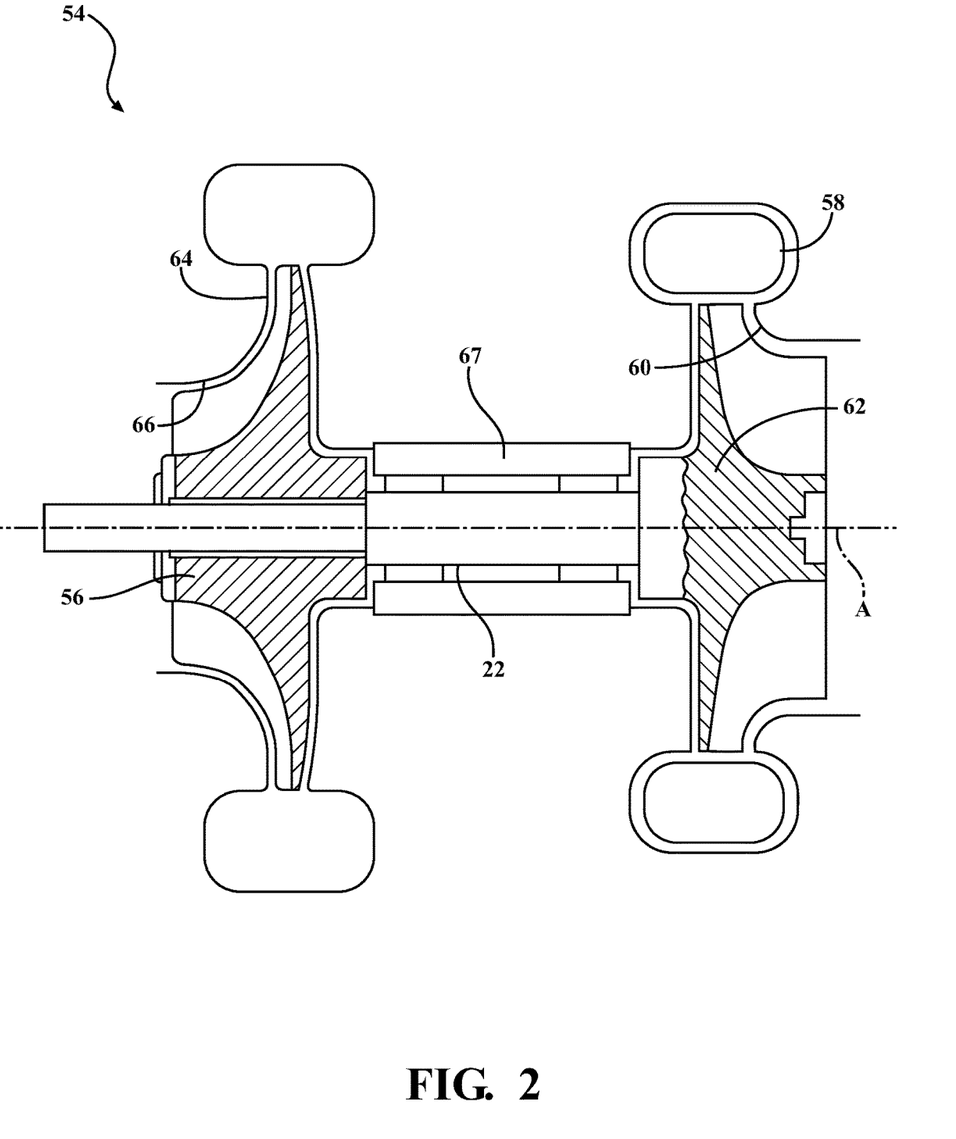
FIG. 2 is a schematic representation of the rotating machine further defined as a turbocharger.

As described above, the rotating machine 20 may be further defined as a turbocharger 54, as shown in FIG. 2. The turbocharger 54 may be an electrified turbocharger, such as an eTurbo, having a rotor and a stator (not shown). The turbocharger 54 includes the shaft 22 extending along the axis A between the first end 24 and the second end 26 spaced from the first end 24 along the axis A. The turbocharger 54 also includes a compressor wheel 56 coupled to the shaft 22, and the carbon ring 28 disposed about the shaft 22 and spaced from the compressor wheel 56. The turbocharger 54 may include a turbine housing 58 defining a turbine housing interior 60. The turbine housing 58 receives and directs exhaust gas from an internal combustion engine. The turbocharger 54 may include a turbine wheel 62 disposed in the turbine housing interior 60 and coupled to the shaft 22 for receiving the exhaust gas from the internal combustion engine. Specifically, the exhaust gas from the internal combustion engine is used to drive the turbine wheel 62. The turbocharger 54 may include a compressor housing 64 defining a compressor housing interior 66. The compressor housing interior 66 receives and directs air to the internal combustion engine. The compressor wheel may be disposed in the compressor housing interior 66. Typically, the mating ring 32 is disposed between the compressor wheel 56 and a thrust bearing 63 with respect to axis A. When present, the thrust bearing 63 is typically disposed between the mating ring 32 a thrust washer 65 with respect to the axis A, as shown in FIG. 1. With continued reference to FIG. 2, the turbocharger 54 may include a bearing housing 67 disposed between the compressor housing 64 and the turbine housing 58 with respect to the axis A. The turbocharger 54 may include a compressor backplate 69 coupled to the bearing housing 67.

With reference to FIG. 3, as described above with respect to the rotating machine 20, the carbon ring 28 of the turbocharger 54 has the carbon surface 30. With reference to FIG. 1, the carbon surface 30 has the carbon ring inner diameter CID and the carbon ring outer diameter COD spaced from the carbon ring inner diameter CID. The turbocharger 54 also includes the mating ring 32, with the mating ring 32 having the interior surface 34 extending along the axis A between the first mating end 36 and the second mating end 38 spaced from the first mating end 36, and with the interior surface 34 defining the bore 40 adapted to be disposed about the shaft 22, as shown in FIG. 3. With reference to FIG. 5, the mating ring 32 for use in the turbocharger 54 also has the mating surface 42 having the land portion 46 adapted to contact the carbon surface 30 between the first mating diameter MD1 adapted to be radially aligned with the carbon ring inner diameter CID with respect to the axis A and the second mating diameter MD2 adapted to be radially aligned with the carbon ring outer diameter COD with respect to the axis A. The land portion 46 has the land area 48 between the first and second mating diameters MD1, MD2, as shown in FIG. 6. The mating surface 42 defines the plurality of grooved portions 50 disposed about the axis A, and the plurality of grooved portions 50 have the grooved area 52 between the first and second mating diameters MD1, MD2.

With reference to FIG. 10, a ratio of the land area 48 to the grooved area 52 is between 1.3 and 2.9. Having the ratio of the land area 48 to the grooved area 52 between 1.3 and 2.9 ensures that the carbon ring 28 lifts off, i.e., becomes disengaged, from the mating ring 32 at the optimal rotational speed from a fluid pressure caused by fluid, which may be caused by oil or air, exiting the plurality of grooved portions 50 caused by rotation of the mating ring 32. For example, having the carbon ring 28 lift off from the mating ring 32 reduces mechanical losses of the turbocharger 54 and improves durability of the turbocharger 54. Specifically, the ratio of the land area 48 to the grooved area 52 between 1.3 and 2.9 improves durability of the carbon ring 28, and reduces mechanical losses caused by the carbon ring 28 and mating ring 32 remaining in contact for too long during startup. The ratio of the land area 48 to the grooved area 52 between 1.3 and 2.9 is optimal for ensuring lift off of the carbon ring 28 from the mating ring 32 does not occur at too low or too high of a rotational speed of the mating ring 32.

If the ratio of the land area 48 to the grooved area 52 is greater than 2.9, the carbon ring 28 is not able to lift off from the mating ring 32 at low rotational speeds of the mating ring 32, such as 10,000 to 20,000 RPM, of the turbocharger 54 because the force ("lift off" force) on the carbon ring 28 caused by fluid pressure inside the plurality of grooved portions 50 is too low. This ultimately decreases performance of the turbocharger 54, because the mating ring 32 and carbon ring 28 remain engaged for too long. Additionally, the carbon ring 28 may not have sufficient sealing performance if the carbon ring 28 and mating ring 32 remain engaged for too long.

If the ratio of the land area 48 to the grooved area 52 is less than 1.3, the land area 48 becomes too small, which results in the plurality of grooved portions 50 damaging the carbon ring 28 because the carbon surface 30 does not have an adequate amount of land area 48 to engage. For example, having the ratio of the land area 48 to the grooved area 52 being less than 1.3, damage to the carbon ring 28 can increase oil leakage and increase blow-by. Additionally, frictional effects may be excessive if the carbon ring 28 and the mating ring 32 remain engaged during high rotational speeds of the mating ring 32, which results in decreased turbocharger performance and potential damage of the carbon ring 28. To this end, having the ratio of the land area 48 to the grooved area 52 between 1.3 and 2.9 allows optimum compromise between lift off speed at low rotational speeds of the mating ring 32 and fluid pressure at low rotational speeds of the mating ring 32 to allow the carbon ring 28 to lift off from the mating ring 32.

It is to be appreciated that the description below of the rotating machine 20 being further defined as the turbocharger 54 may equally apply to the rotating machine 20 including the electric assembly 56, such as an eBooster®. Namely, the description of the mating ring 32 and the carbon ring 28 with respect to the turbocharger 54 equally applies to the mating ring 32 and the carbon ring 28. In particular, the configuration of the plurality of grooved portions 50 and the ratio of the land area 48 to the grooved area 52 in the turbocharger 54 equally applies to the plurality of grooved portions 50 and the ratio of the land area to the grooved area 52 of the rotating machine 20.

With reference to FIG. 3, the seal assembly 44 may include a seal housing 68 defining a seal housing interior 70. When present the seal housing 68 is present, the carbon ring 28 is disposed in the seal housing interior 70. The seal assembly 44 may also include a biasing member 72 disposed in the seal housing interior 70. When present, the biasing member 72 is coupled to the seal housing 68 and the carbon ring 28 such that the biasing member 72 is adapted to bias the carbon ring 28 toward the mating ring 32. Specifically, when present, the biasing member 72 is adapted to bias the carbon surface 30 toward the mating surface 42. In one embodiment, the biasing member 72 is a spring. The seal assembly 44 may include a secondary seal 74 coupled to the seal housing 68 and the carbon ring 28 to prevent leakage of lubricating oil. In one embodiment, the secondary seal 74 is an O-ring seal.

The carbon ring 28 may be moveable between a first position where the carbon surface 30 is engaged with the mating surface 42 (i.e., before startup), and a second position where the carbon surface 30 is spaced from the mating surface 42 such that the carbon surface 30 and the mating surface 42 are disengaged to allow rotation of the mating ring 32 (i.e., after startup). Typically, the carbon surface 30 and the mating surface 42 define a gap between one another when the carbon ring 28 is in the second position. The gap may be between 0.5 and 4 microns. The gap defined between the carbon surface 30 and the mating surface 42 when the carbon ring 28 is in the second position results in minimal efficiency loss after "lift-off." The carbon surface 30 and the mating surface 42 may have a gas film formed by rotation of the mating ring 32 when the carbon ring 28 is in the second position. As described above, the gap is typically between 0.5 and 4 microns. Having the gap defined between the carbon surface 30 and the mating surface 42 allows the turbocharger 54 to be a vertical or horizontal turbocharger, whereas standard piston ring sealing systems require the turbocharger to be horizontally arranged. Additionally, when the carbon 28 is in the second position, the mating ring 32 directs oil radially away from the axis A during rotation of the shaft 22, which prevents oil from leaking to unwanted areas of the turbocharger 54, such as to the compressor wheel 56 or other sealing systems, and helps direct oil flow toward an oil drain defined by the bearing housing 67 of the turbocharger 54.

The mating ring 32 may be configured as a flinger, as shown in FIG. 3. Specifically, when the mating ring 32 is configured as a flinger, the mating ring 32 includes a cylindrical sleeve 76 coupled to and rotatable with the shaft 22, and a flange 78 extending radially from the cylindrical sleeve 76. In such embodiments, the flange 78 has the mating surface 42. The flange 78 may have a flange inner diameter FID and a flange outer diameter FOD radially spaced from the flange inner diameter FID with respect to the axis A, as shown in FIG. 5. Additionally, when the mating ring 32 is configured as a flinger, the mating ring 32 directs fluid outwardly during rotation of the shaft to direct fluid to separate the carbon ring 28 and the mating ring 32. It is to be appreciated that when the mating ring 32 is configured as a flinger that the mating ring 32 may also be referred to as a flinger sleeve. It is also to be appreciated that a surface facing opposite the mating surface 42 may be configured as a thrust bearing runner surface.

Typically, the plurality of grooved portions 50 is further defined as having between three and ten grooves. In one embodiment, the plurality of grooved portions 50 has between four and nine grooves. In another embodiment, the plurality of grooved portions 50 has between five and eight grooves. In another embodiment, the plurality of grooved portions 50 has six grooves. In yet another embodiment, the plurality of grooved portions 50 has seven grooves. Having the plurality of grooved portions 50 being further defined as having between three and ten grooves, although not required, is helpful to achieve the ratio of the land area 48 to the grooved area 52 between 1.3 and 2.9.

Typically, the plurality of grooved portions 50 are defined into the mating surface 42. The plurality of grooved portions 50 may be etched, such as through etching or laser etching, into the mating surface 42. The plurality of grooved portions 50 may be etched or laser etched into the mating surface 42 at a right angle. It is to be appreciated that the plurality of grooved portions 50 may have a non-uniform depth, which may result in the plurality of grooved portions 50 being etched into the mating surface 42 at a non-right angle. Typically, the plurality of grooved portions 50 have a depth defined into the mating surface 42 greater than 0.005 mm. Having the plurality of grooved portions 50 having a depth defined into the mating surface 42 greater than 0.005 mm allows the plurality of grooved portions 50 to still be effective during operation despite carbon deposits in the plurality of grooved portions 50. Typically, the plurality of grooved portions 50 have a depth defined into the mating surface that is less than 0.040 mm. Having the plurality of grooved portions 50 having a depth defined into the mating surface 42 that is less than 0.040 mm reduces time needed to manufacture the plurality of grooved portions 50, for example though etching or laser etching. As such, the plurality of grooved portions 50 typically have a depth defined into the mating surface 42 between 0.005 mm to 0.040 mm. Having a depth of the plurality of grooved portions 50 between 0.005 mm and 0.040 mm allows both the plurality of grooved portions 50 to still be effective during operation despite carbon deposits in the plurality of grooved portions 50, and reduces the time needed to manufacture the plurality of grooved portions 50, for example though etching or laser etching. In one embodiment, the depth of the plurality of grooved portions 50 may be between 0.010 mm and 0.035 mm. In another embodiment, the depth of the plurality of grooved portions 50 may be between 0.015 mm and 0.030 mm. In another embodiment, the depth of the plurality of grooved portions may be between 0.020 mm and 0.025 mm.

In one embodiment, the plurality of grooved portions 50 are spiraled about the axis A. Having the plurality of grooved portions 50 spiraled about the axis A allows the mating ring 32 to direct fluid outwardly, which helps with the lift off of the carbon ring 28 from the mating ring 32. Typically, the plurality of grooved portions 50 are spiraled about the axis A when the rotating machine 20 is a single direction machine, i.e., the shaft 22 spins only in one direction about the axis, such as the turbocharger 54. When the rotating machine 20 is not a single direction machine, the plurality of grooved portions 50 may have a configuration that does not spiral about the axis A, such as T-shaped or rectangular grooves.

Figure 9:
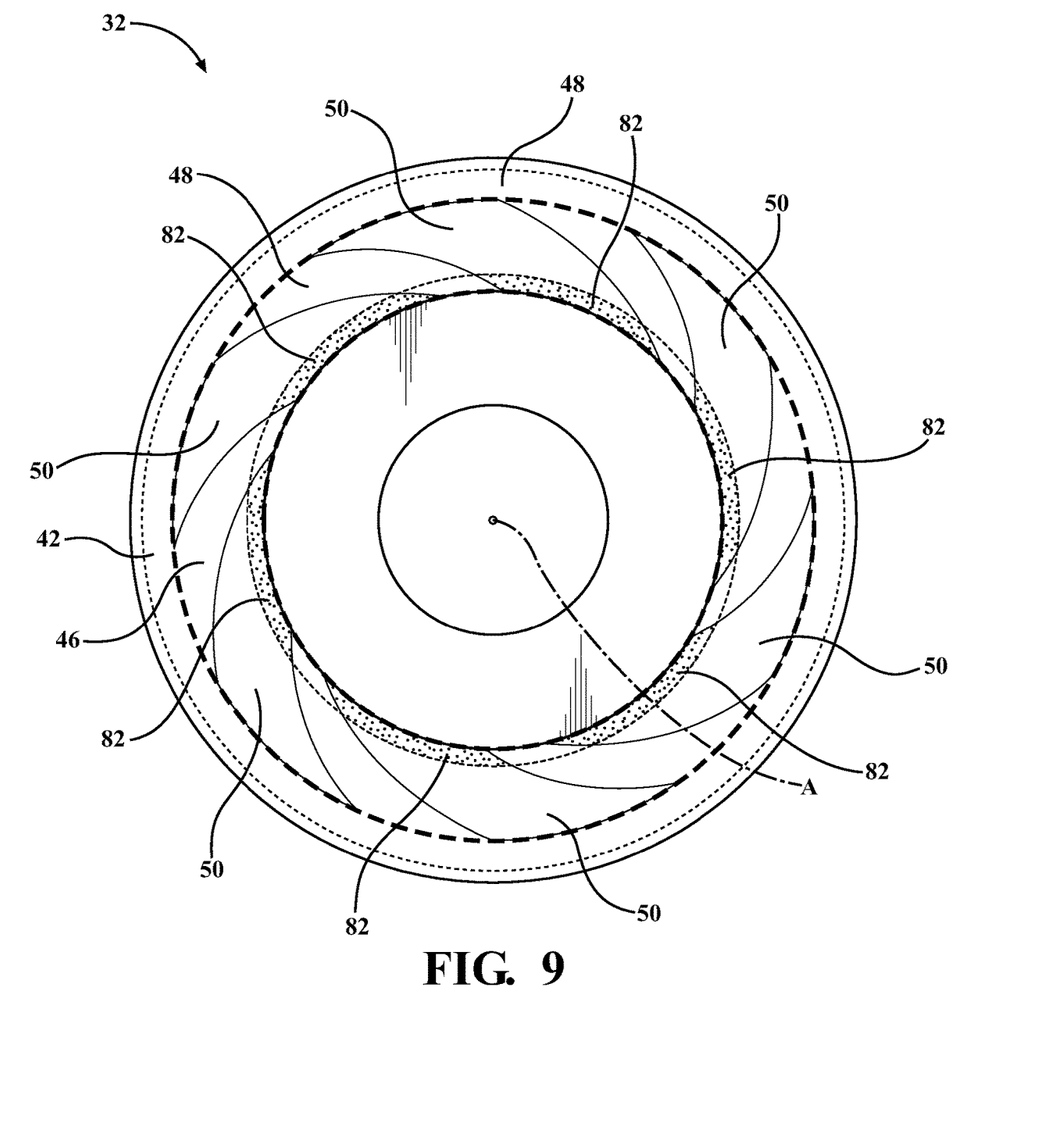
FIG. 9 is a top view of the mating surface of the mating ring, with the plurality of grooved portions having an inactive groove area that is not between the first and second mating diameters, and with the inactive grooved area shaded.

In one embodiment, the plurality of grooved portions 50 has a groove inner diameter ID, as shown in FIG. 5, and a ratio of the carbon ring inner diameter CID to the groove inner diameter ID is adapted to be greater than 1.0. When the ratio of the carbon ring inner diameter CID to the groove inner diameter ID is adapted to be greater than 1.0, the plurality of grooved portions 50 extends beyond the carbon ring inner diameter CID and inward toward the axis A, as shown in FIG. 5. As shown in FIG. 9, the plurality of grooved portions 50 extends beyond the carbon ring inner diameter CID and inward toward the axis A, which results in the plurality of grooved portions 50 having an inactive groove area 82, which is shown in FIG. 9 as the shaded area of the plurality of grooved portions 50. Having the plurality of grooved portions 50 extending beyond the carbon ring inner diameter CID and inward toward the axis A allows the plurality of grooved portions 50 to maintain fluid communication to the carbon surface 30 adjacent the carbon ring inner diameter CID to promote "lift off" of the carbon ring 28. In other words, the plurality of grooved portions 50 is open at the groove inner diameter ID such that the plurality of grooved portions 50 are able to direct fluid toward the groove outer diameter OD to generate enough fluid pressure to "lift off" the carbon ring 28. Typically, the ratio of the carbon ring inner diameter CID to the groove inner diameter ID is less than 1.2. Having the ratio of the carbon ring inner diameter CID to the groove inner diameter ID less than 1.2 allows the carbon ring 28 to be smaller in size, which results in better packaging of the mating ring 32 and the carbon ring 28, which ultimately results in less space occupied in the turbocharger 54. The ratio of the carbon ring inner diameter CID to the groove inner diameter ID may be adapted to be between 1.02 and 1.10. Having the ratio of the carbon ring inner diameter CID to the groove inner diameter ID between 1.02 and 1.10 results the benefit of having both the plurality of grooved portions 50 maintain fluid communication to the carbon surface 30 adjacent the carbon ring inner diameter CID to promote "lift off" of the carbon ring 28, as described above, and better packaging of the mating ring 32 and the carbon ring 28. In one embodiment, the ratio of the carbon ring inner diameter CID to the groove inner diameter ID may be adapted to be between 1.03 and 1.09. In another embodiment, the ratio of the carbon ring inner diameter CID to the groove inner diameter ID may be adapted to be between 1.04 and 1.08. In another embodiment, the ratio of the carbon ring inner diameter CID to the groove inner diameter ID may be adapted to be between 1.05 and 1.07. In another embodiment, the ratio of the carbon ring inner diameter CID to the groove inner diameter ID may be adapted to be 1.05.

Figure 7:
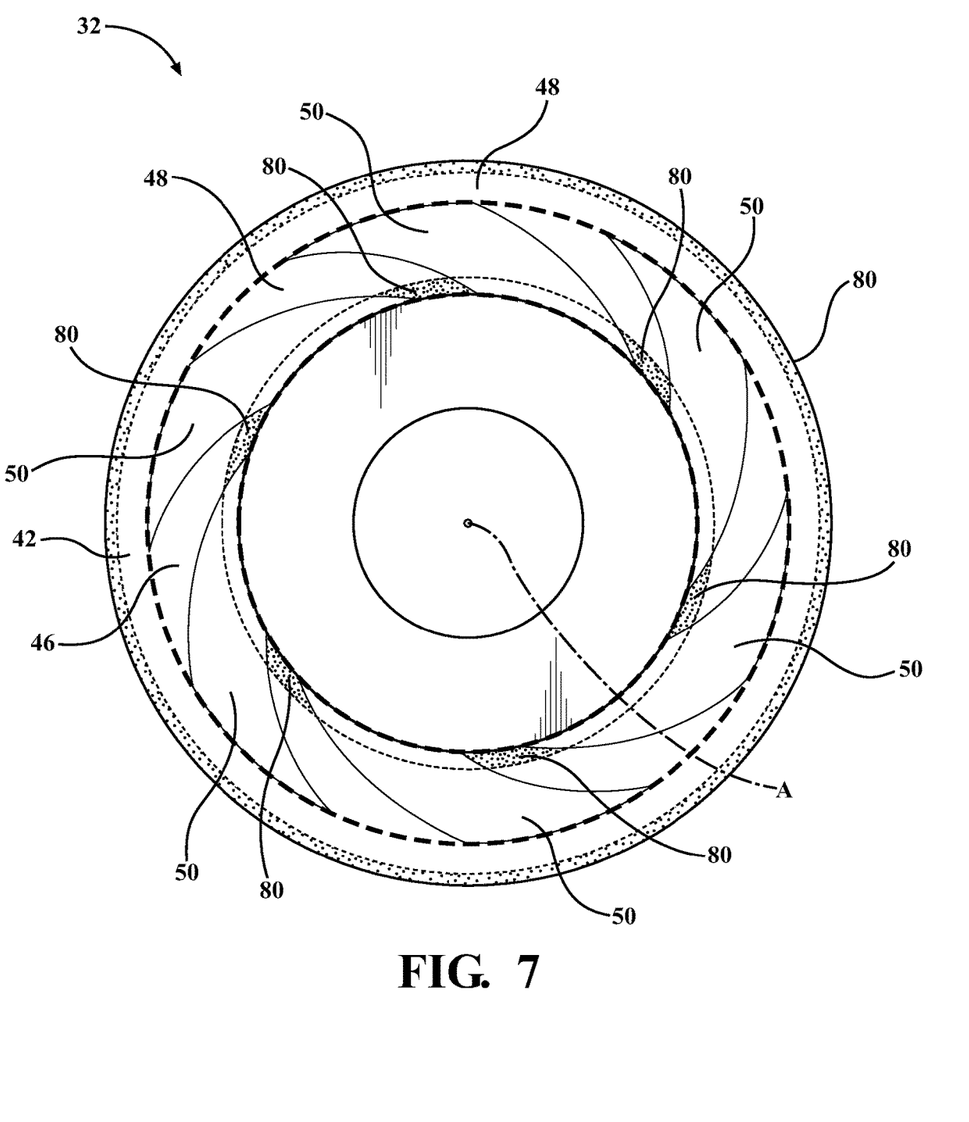
FIG. 7 is a top view of the mating surface of the mating ring, with the land portion having an inactive land area that is not between the first and second mating diameters, and with the inactive land area shaded.

The plurality of grooved portions 50 may have a groove outer diameter OD, as shown in FIG. 5. A ratio of the carbon ring outer diameter COD to the groove outer diameter OD may be adapted to be greater than 1.0. When the ratio of the carbon ring outer diameter COD to the groove outer diameter OD is greater than 1.0, the carbon ring 28 extends beyond the groove outer diameter OD radially away from the axis A. As shown in FIG. 7, the mating surface 42 may have an inactive land area 80, which is shown in FIG. 7 as the shaded area on the mating surface 42. When present, the inactive land area 80 is not contacted by the carbon surface 30. Having the carbon ring 28 extending beyond the groove outer diameter OD radially away from the axis A allows plurality of grooved portions 50 at the groove outer diameter OD to be sealed against the carbon surface 30. Typically, the ratio of the carbon ring outer diameter COD to the groove outer diameter OD is less than 1.5. Having the ratio of the carbon ring outer diameter COD to the groove outer diameter OD less than 1.5 results in better packaging of the mating ring 32 and the carbon ring 28, which ultimately results in less space occupied in the turbocharger 54. The ratio of the carbon ring outer diameter COD to the groove outer diameter OD may be adapted to be between 1.05 and 1.25. Having the ratio of the carbon ring outer diameter COD to the groove outer diameter OD between 1.05 and 1.25 results in the benefit of having both the plurality of grooved portions 50 at the groove outer diameter OD being sealed against the carbon surface 30, and better packaging of the mating ring 32 and the carbon ring 28. In one embodiment, the ratio of the carbon ring outer diameter COD to the groove outer diameter OD may be adapted to be between 1.10 and 1.20. In another embodiment, the ratio of the carbon ring outer diameter COD to the groove outer diameter OD may be adapted to be 1.15.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine and for receiving exhaust gas from the internal combustion engine, said turbocharger comprising:

a shaft extending along an axis between a first end and a second end spaced from said first end along said axis;

a compressor wheel coupled to said first end of said shaft; and a seal assembly comprising, a carbon ring disposed about said shaft and spaced from said compressor wheel along said axis, with said carbon ring having a carbon surface having a carbon ring inner diameter and a carbon ring outer diameter spaced from said carbon ring inner diameter radially away from said axis, and a mating ring disposed about said shaft and spaced from said compressor wheel along said axis such that said carbon ring is disposed between said compressor wheel and said mating ring, with said mating ring having a mating surface facing said carbon surface of said carbon ring, with said mating surface having a land portion configured to contact said carbon surface between a first mating diameter radially aligned with said carbon ring inner diameter with respect to said axis and a second mating diameter radially aligned with said carbon ring outer diameter with respect to said axis, and with said land portion having a land area between said first and second mating diameters, and with said mating surface defining a plurality of grooved portions disposed about said axis, and with said plurality of grooved portions having a grooved area between said first and second mating diameters;

wherein a ratio of said land area to said grooved area is between 1.3 and 2.9;

wherein said plurality of grooved portions has a groove outer diameter;

wherein a ratio of said carbon ring outer diameter to said groove outer diameter is between 1.10 and 1.5;

wherein said plurality of grooved portions has a groove inner diameter, and wherein a ratio of said carbon ring inner diameter to said groove inner diameter is between 1.02 and 1.10; and wherein said plurality of grooved portions have a depth defined into said mating surface between 0.005 mm to 0.040 mm.

2. The turbocharger as set forth in claim 1, wherein said plurality of grooved portions are spiraled about said axis.

3. The turbocharger as set forth in claim 1, wherein said mating ring comprises a cylindrical sleeve coupled to and rotatable with said shaft, and a flange extending radially from said cylindrical sleeve such that said mating ring is configured as a flinger.

4. The turbocharger as set forth in claim 1, further comprising a turbine housing defining a turbine housing interior, a turbine wheel coupled to said shaft and disposed in said turbine housing interior, and a compressor housing defining a compressor housing interior, wherein said compressor wheel is disposed in said compressor housing interior.

5. The turbocharger as set forth in claim 1, wherein said ratio of said carbon ring outer diameter to said groove outer diameter is between 1.10 and 1.25.

6. A mating ring for use in a rotating machine, the rotating machine including a shaft, and a carbon ring having a carbon surface having a carbon ring inner diameter and a carbon ring outer diameter spaced from the carbon ring inner diameter, said mating ring comprising:
    an interior surface extending along an axis between a first mating end and a second mating end spaced from said first mating end, with said interior surface defining a bore adapted to be disposed about the shaft; and
    a mating surface having a land portion adapted to contact the carbon surface between a first mating diameter adapted to be radially aligned with the carbon ring inner diameter with respect to said axis and a second mating diameter adapted to be radially aligned with the carbon ring outer diameter with respect to said axis, with said land portion having a land area between said first and second mating diameters;
    with said mating surface defining a plurality of grooved portions disposed about said axis, and with said plurality of grooved portions having a grooved area between said first and second mating diameters;
    wherein a ratio of said land area to said grooved area is between 1.3 and 2.9;
    wherein said plurality of grooved portions has a groove outer diameter;
    wherein a ratio of the carbon ring outer diameter to said groove outer diameter is adapted to be between 1.10 and 1.5;
    wherein said plurality of grooved portions has a groove inner diameter, and wherein a ratio of the carbon ring inner diameter to said groove inner diameter is adapted to be between 1.02 and 1.10; and
    wherein said plurality of grooved portions have a depth defined into said mating surface between 0.005 mm to 0.040 mm.

7. The mating ring as set forth in claim 6, wherein said plurality of grooved portions comprise 3 to 10 grooves.

8. The mating ring as set forth in claim 6,
    wherein the ratio of the carbon ring inner diameter to said groove inner diameter is adapted to be between 1.07 and 1.10.

9. A rotating machine comprising said mating ring as set forth in claim 8, and further comprising:
    said shaft extending along said axis between a first end and a second end spaced from said first end along said axis;
    a compressor wheel coupled to said first end of said shaft; and
    a seal assembly comprising said mating ring and said carbon ring.

10. The mating ring as set forth in claim 6, wherein said ratio of said carbon ring outer diameter to said groove outer diameter is adapted to be between 1.10 and 1.25.

11. A turbocharger for delivering compressed air to an internal combustion engine and for receiving exhaust gas from the internal combustion engine, said turbocharger comprising:
    a shaft extending along an axis between a first end and a second end spaced from said first end along said axis;
    a compressor wheel coupled to said first end of said shaft; and
    a seal assembly comprising,
        a carbon ring disposed about said shaft and spaced from said compressor wheel along said axis, with said carbon ring having a carbon surface having a carbon ring inner diameter and a carbon ring outer diameter spaced from said carbon ring inner diameter radially away from said axis, and
        a mating ring disposed about said shaft and spaced from said compressor wheel along said axis such that said carbon ring is disposed between said compressor wheel and said mating ring, with said mating ring having a mating surface facing said carbon surface of said carbon ring,
        with said mating surface having a land portion configured to contact said carbon surface between a first mating diameter radially aligned with said carbon ring inner diameter with respect to said axis and a second mating diameter radially aligned with said carbon ring outer diameter with respect to said axis, and with said land portion having a land area between said first and second mating diameters, and
        with said mating surface defining a plurality of grooved portions disposed about said axis, and with said plurality of grooved portions having a grooved area between said first and second mating diameters;
    wherein a ratio of said land area to said grooved area is between 1.3 and 2.9;
    wherein said seal assembly further comprises a seal housing defining a seal housing interior;
    wherein said carbon ring is disposed in the seal housing interior;
    wherein said seal housing has an inner seal housing diameter with respect to said axis;
    wherein said carbon ring inner diameter is less than said inner seal housing diameter; and
    wherein said seal assembly further comprises a secondary seal coupled to said seal housing and said carbon ring, wherein said seal housing has a U-shaped portion with respect to and facing away from said axis, and wherein said secondary seal is disposed in said U-shaped portion.

12. The turbocharger as set forth in claim 11, wherein said mating ring comprises a cylindrical sleeve coupled to and rotatable with said shaft, and a flange extending radially from said cylindrical sleeve such that said mating ring is configured as a flinger, wherein said cylindrical sleeve has a first cylindrical portion spaced axially from said flange with respect to said axis, and a second cylindrical portion adjacent said flange and disposed between said flange and said first cylindrical portion with respect to said axis, and wherein said second cylindrical portion has an outer diameter that is less than an outer diameter of said first cylindrical portion.

13. The turbocharger as set forth in claim 12, wherein said carbon ring has a first carbon ring portion protruding toward said axis, wherein said protruding portion has said carbon ring inner diameter, and wherein said first carbon ring portion protrudes toward a recess defined between said first cylindrical portion and said second cylindrical portion.

14. The turbocharger as set forth in claim 11, wherein said carbon ring has a first carbon ring portion having said carbon surface and having said carbon ring inner diameter, and a second carbon ring portion disposed in said seal housing, and wherein said first carbon ring portion and said second carbon ring portion secure said secondary seal in said U-shaped portion of said seal housing.

15. The turbocharger as set forth in claim 11, further comprising a turbine housing defining a turbine housing interior, a turbine wheel coupled to said shaft and disposed in said turbine housing interior, and a compressor housing defining a compressor housing interior, wherein said compressor wheel is disposed in said compressor housing interior.

16. The turbocharger as set forth in claim 11, wherein said plurality of grooved portions are spiraled about said axis.

17. The turbocharger as set forth in claim 11, wherein said plurality of grooved portions has a groove outer diameter;
wherein a ratio of the carbon ring outer diameter to said groove outer diameter is adapted to be between 1.10 and 1.5;
wherein said plurality of grooved portions has a groove inner diameter, and wherein a ratio of the carbon ring inner diameter to said groove inner diameter is adapted to be between 1.02 and 1.10; and
wherein said plurality of grooved portions have a depth defined into said mating surface between 0.005 mm to 0.040 mm.

18. The turbocharger as set forth in claim 11,
further comprising a turbine housing defining a turbine housing interior, a turbine wheel coupled to said shaft and disposed in said turbine housing interior, and a compressor housing defining a compressor housing interior, wherein said compressor wheel is disposed in said compressor housing interior;
wherein said plurality of grooved portions are spiraled about said axis;
wherein said plurality of grooved portions has a groove outer diameter;
wherein a ratio of the carbon ring outer diameter to said groove outer diameter is adapted to be between 1.10 and 1.5; and
wherein said plurality of grooved portions has a groove inner diameter, and wherein a ratio of the carbon ring inner diameter to said groove inner diameter is adapted to be between 1.02 and 1.10.

19. The turbocharger as set forth in claim 18, wherein said plurality of grooved portions have a depth defined into said mating surface between 0.005 mm to 0.040 mm.

* * * * *